United States Patent Office 3,679,663
Patented July 25, 1972

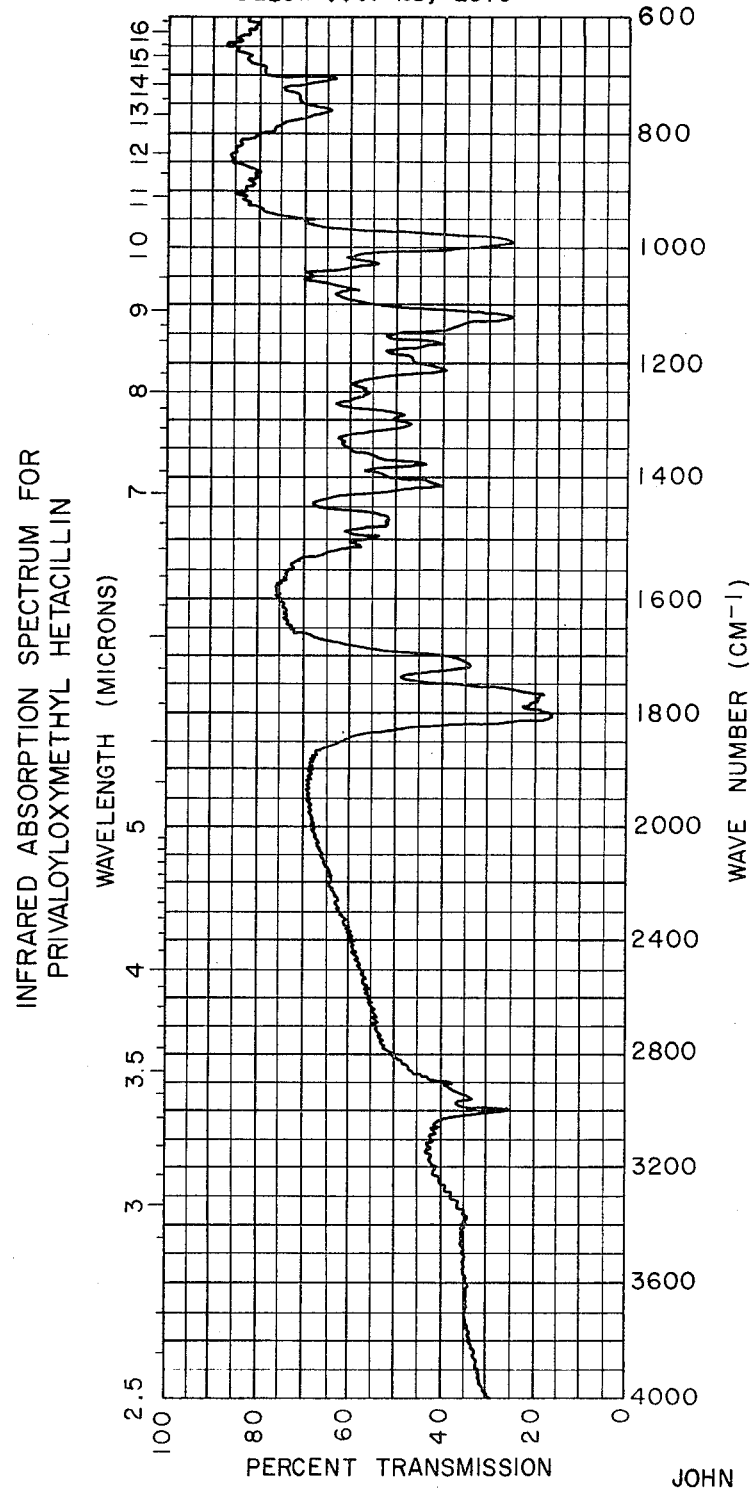

3,679,663
PIVALOYLOXYMETHYL HETACILLIN
John Michael Essery, Fayetteville, N.Y., assignor to Bristol-Myers Company, New York, N.Y.
Filed Oct. 28, 1970, Ser. No. 84,743
Int. Cl. C07d 99/16
U.S. Cl. 260—239.1                                     1 Claim

ABSTRACT OF THE DISCLOSURE

The specification discloses the compound pivaloyloxymethyl hetacillinate and a method for the preparation thereof. This compound is useful in the treatment of infectious diseases in mammals.

BACKGROUND OF THE INVENTION

The invention is concerned with antibiotics and, more particularly, with ester derivatives of the antibiotic known as hetacillin. Hetacillin is a penicillin derivative known, in the acid form, as 6-(2,2-dimethyl-5-oxo-4-phenyl-1-imidazolidinyl)penicillanic acid. This compound, i.e., hetacillin, and many closely related compounds and the preparation thereof is disclosed in U.S. Pat. 3,198,804. Esters of benzylpenicillins are disclosed in British Pat. 1,003,479 and acyloxymethyl esters of ampicillin are discussed by W. V. Daehne et al. in J. Med. Chem., 13 (4), 607–612 (1970). This publication also refers to early publications on the hydrolysis of esters. The pivaloyloxymethyl ester of ampicillin is also disclosed in South African Pat. 68/5952.

More particularly, the invention is directed to the pivaloyloxymethyl ester of hetacillin, a compound which has the following structural formula:

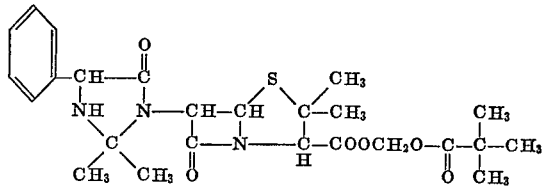

The term, hetacillin, as used herein, is intended to include the free-acid form as well as any of the pharmaceutically acceptable organic and inorganic esters and salts of the free acid and the D- and L-diastereoisomers.

Pivaloyloxymethyl ester of hetacillin can be conveniently prepared by reacting hetacillin with a suitable esterifying derivative of pivalic acid containing the group

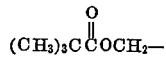

A suitable esterifying agent is a halomethyl ester, such as the bromo, iodo, or fluoromethyl esters. Chloromethylpivalate is generally preferred. Chloromethylpivalate is a known compound which can be prepared by treating the acid halide of pivalic acid with p-formaldehyde. The reaction is carried out in a substantially water-free, nonaqueous polar solvent.

It is preferred that the solvent be not only nonaqueous but that it be as dry, i.e., free of water, as possible. A preferred solvent is hexamethylphosphortriamide. Other illustrative polar organic solvents include dimethylformamide, dimethylacetamide, dry acetone, dimethylsulfoxide, and the like.

Dry or water-free solvents can be conveniently prepared and maintained during the reaction by the use of suitable water-absorbing additives such as the Linde Molecular Sieve 4A. The molecular sieves can be easily separated from the reaction mixture by filtration.

The esterification reaction can be conveniently carried out at room temperature or at some temperature up to the boiling point of the various components of the reaction mixture. Since the herein disclosed hetacillin ester is sensitive, it is preferred to conduct the reaction at relatively low temperatures.

The pivaloyloxymethyl ester of hetacillin can also be prepared from 6-aminopenicillanic acid. The 6-aminopenicillanic acid can be esterified, e.g., with chloromethylpivalate, followed by acylation of the free-amino group by conventional techniques well known in the penicillin and cephalosporin fields and subsequent reaction of the ester with acetone.

After completion of the reaction and formation of the hetacillin ester, the reaction product, which is of relatively low water solubility, can be recovered by conventional techniques known to those in the antibiotic field and which are illustrated in the accompanying examples. Solvents, wash liquids, and the like can be removed by evaporation at room temperature or at slightly elevated temperatures, with or without the use of vacuum. Solids, including crystals, can be separated and recovered by filtration.

The oral absorption of pivaloyloxymethyl hetacillin was measured in terms of activity of hetacillin recoverable from the urine of rats and was found to be excellent.

In this test, control animals were given an oral dose of 50 mg. per kg. of hetacillin, and the test animals received a therapeutically equivalent dose of the ester. The urine was collected over Dry Ice and bioassayed. Recovery over a twenty-four hour period for the control animals averaged 8.49 micrograms of hetacillin activity and 9.47 micrograms of hetacillin activity for the pivaloyloxymethyl ester.

The pivaloyloxymethyl ester of hetacillin has a distinctive infrared absorption spectrum, shown in FIG. 1, which is easily distinguishable from the hetacillin spectrum. The ester also has a distinctive n.m.r. spectrum, as shown in the following examples.

Hetacillin and its pivaloyloxymethyl ester are weakly basic and can be reacted with strong acids to form acid addition salts. Illustrative acids include the mineral acids, such as hydrochloric acid, hydrobromic acid, hydroiodic acid, sulfuric acid, nitric acid, phosphoric acid, and the like. Also included are the stronger organic acids, such as maleic acid, acetic acid, citric acid, tartaric acid, benzoic acid, p-toluenesulfonic acid, β-naphthalenesulfonic acid, and other acids such as those disclosed in U.S. Pat. 3,198,804.

The compounds of this invention can be prepared in various dosage forms in admixture with the well-known and pharmaceutically useful excipients, binders, suspending agents, stabilizers for use in tablets, capsules, suspensions, and other solid and liquid formulations. The resulting dosage forms are useful in the treatment of bacterial infections for which the parent compound, hetacillin, has been found useful. Illustrative bacterial infections are those caused by Staph. aureus Smith, Sal. enteritidis, and Klebsiella pneumoniae.

Table I, below, shows the minimum inhibitory concentration, in micrograms per milliliter, by serial tube dilution for hetacillin and the pivaloyloxymethyl ester of hetacillin in water and rat serum.

TABLE I

| Organism | Rat serum | | Water | |
|---|---|---|---|---|
| | Hetacillin | Piv. het. | Hetacillin | Piv. het. |
| S. aureus Smith | .06 | .03 | .03 | .03 |
| S. aureus (resistant) | 16.0 | 32.0 | 16.0 | 32.0 |
| Sal. enteritidis | 0.13 | 0.5 | 0.13 | 0.5 |
| E. coli Juhl | 2.0 | 4.0 | 1.0 | 8.0 |
| K. pneumoniae | 0.25 | 2.0 | 0.5 | 2.0 |
| Pr. mirabilis | 0.13 | 0.5 | 0.25 | 1.0 |

EXAMPLE 1

Pivaloyloxymethyl 6{D(—) - 2,2 - dimethyl-5-oxo-4-phenyl-1-imidazolidinyl}penicillanate.—A solution containing 15.6 grams (.04 mole) of 6{D(—)-2,2-dimethyl-5-oxo-4-phenyl-1-imidazolidinyl}penicillanic acid and 4.0 grams (.04 mole) of triethylamine in 60 milliliters of dry N,N-dimethylacetamide was stirred for 30 minutes in the presence of Linde 4A molecular sieves. Six grams (.04 mole) of chloromethylpivalate was added, and the mixture was stirred for 18 hours at room temperature. The mixture was filtered to remove the sieves and triethylamine hydrochloride. The filtrate was added dropwise to a stirred solution of 35 grams sodium chloride in 700 milliliters of water layered with 100 milliliters of n-hexane at a temperature of 5° C. to 10° C. The product separated as a solid which was collected by filtration, washed with n-hexane and dried in vacuo. The solid was slurried in 150 milliliters of dry ether and some insoluble material was removed by filtration. Evaporation of the solvent from the filtrate, under reduced pressure, gave a foam which was triturated with n-hexane to give a solid. Thin-layer chromatography on silica gel with benzene-isopropanol (9:1) as the solvent showed a major zone ($R_f$ 0.52) and 2 small zones. Infrared spectrum (KBr disc) showed absorption maxima (cm.$^{-1}$) at 1795 ($\beta$-lactam carbonyl); 1760 (ester carbonyl); 1700 (imidazolidinone); 1115 (ester C—O—C); 705 (phenyl).

The n.m.r. spectrum of a deuteriochloroform solution (containing deuterium oxide) of the ester showed absorptions (in p.p.m. ($\delta$) from tetramethylsilane) which were assigned as follows: broad peak at 7.1 to 7.7 for the protons of the benzene ring; AB pattern at 5.7 to 5.95 due to the methylene protons of the ester; doublet centered at 5.58 (J=4 cps.) and a doublet centered at 4.78 for the $\beta$-lactam hydrogens; singlet at 4.68 due to the imidazolidine ring proton; singlet at 4.58 for the hydrogen at $C_3$ of the penicillin nucleus; multiplet at 1.35 to 1.9 for the four methyl groups; singlet at 1.22 due to the protons of the t-butyl group.

EXAMPLE 2

Pivaloyloxymethyl 6{D(—) - 2,2 - dimethyl-5-oxo-4-phenyl-1-imidazolidinyl}penicillanate.—To a vigorously stirred slurry of 17.1 grams (.04 mole) of potassium 6{D(—) - 2,2 - dimethyl-5-oxo-4-phenyl-1 - imidazolidinyl}penicillanate in 60 milliliters of dry hexamethylphosphortriamide was added 6.0 grams (.04 mole) of chloromethylpivalate. This mixture was stirred for 18 hours at room temperature. The mixture was added dropwise over two hours to a stirred and chilled (5° C. to 10° C.) solution of 40 grams of sodium chloride in 800 milliliters of water. A solid precipitated, and it was collected by filtration, washed with water, and dried in vacuo. Yield: 17.5 grams, 87% M.P. 44° dec.; $[\alpha]_D^{23}$+191° (c. 1.0, acetone).

Thin-layer chromatography on silica gel with benzene-isopropanol-acetic acid (36:4:1) showed one zone at $R_f$ 0.63. The infrared spectrum (KBr disc) showed absorption maxima (cm.$^{-1}$) at 1800 ($\beta$-lactam carbonyl); 1765 (ester carbonyl); 1715 (imidazolidinone); 1120 (ester C—O—C); 710 (phenyl).

The n.m.r. spectrum of a deuteriochloroform solution of the ester showed absorption (in p.p.m. ($\delta$) from tetramethylsilane) where were assigned as follows: multiplet at 7.2 to 7.7 (5H) due to the benzene ring protons; AB pattern at 5.71 to 5.96 (2H) due to the methylene protons of the ester; doublet centered at 5.60 (1H, J=4 cps.) and doublet centered at 4.80 (1H, J=4 cps.) for the $\beta$-lactam protons; singlet at 4.7 (1H) for the imidazolidinone ring proton; singlet at 4.6 (1H) for the hydrogen at $C_3$ of the penicillin nucleus; multiplet at 1.37 to 1.85 (11H) for the four methyl groups (a peak due to acetone at 2.15 was observed indicating partial decomposition of the imidazolidine ring); single at 1.22 (9H) for the t-butyl group; single peaks at 2.72 and 2.58 due to residual hexamethylphosphortriamide.

I claim:
1. A compound selected from the group consisting of the pivaloyloxymethyl ester of hetacillin having the formula

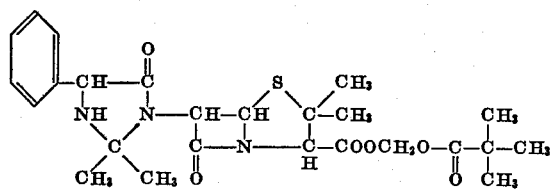

and the pharmaceutically acceptable non-toxic salts thereof.

References Cited
UNITED STATES PATENTS 3,198,804  8/1965  Johnson et al. _____ 260—306.7
3,250,679  5/1966  Jansen et al. _____ 260—239.1

NICHOLAS S. RIZZO, Primary Examiner

U.S. Cl. X.R.
424—271

Notice of Adverse Decision in Interference

In Interference No. 98,359, involving Patent No. 3,679,663, J. M. Essery, PIVALOYLOXYMETHYL HETACILLIN, final judgment adverse to the patentee was rendered Mar. 13, 1975, as to claim 1.

[*Official Gazette August 5, 1975.*]